Robert M. Primmer. Ditching Machine.
No. 117813
Patented Aug. 8 1871
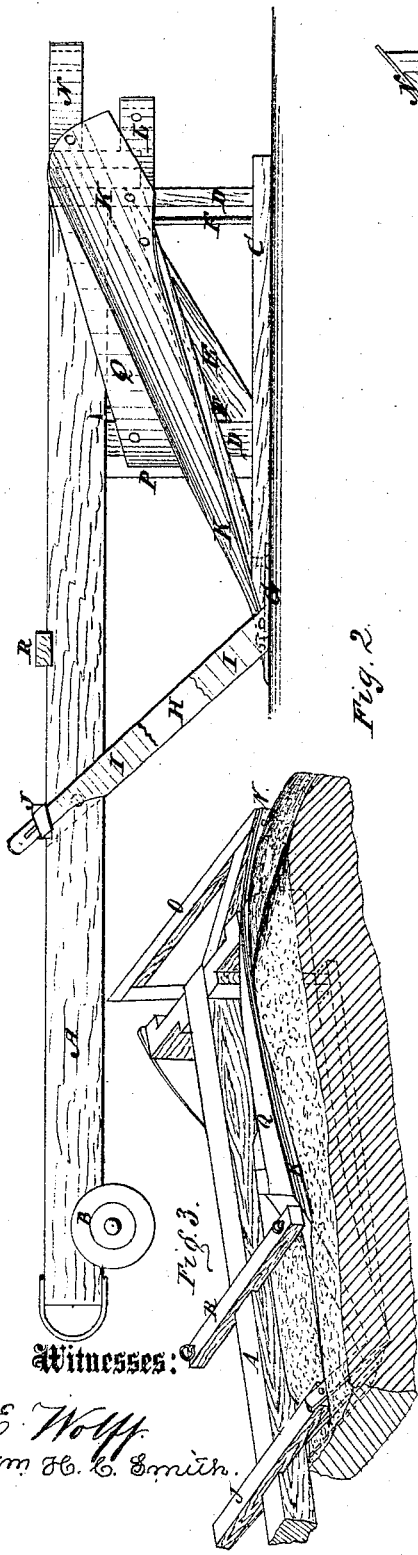
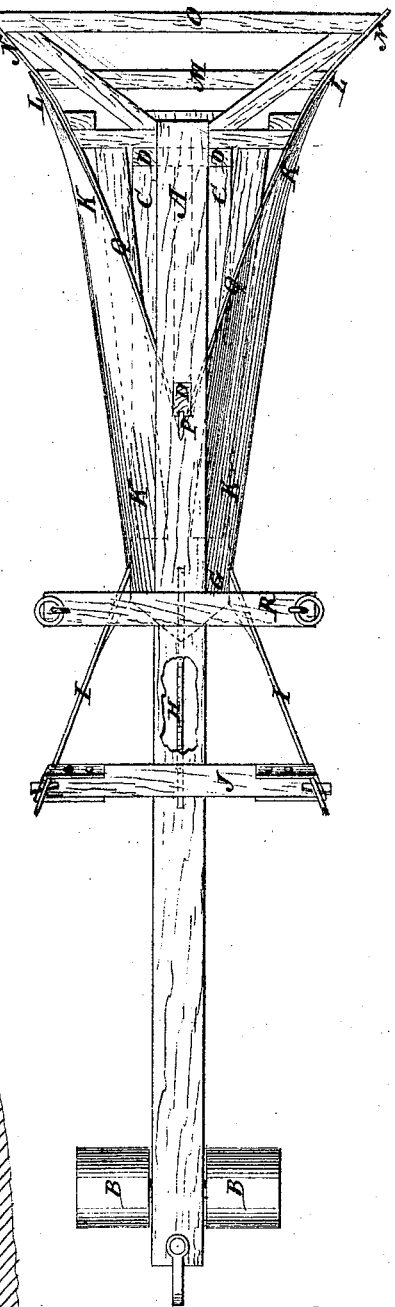
Witnesses:
E. Wolff
Wm. H. C. Smith
Inventor:
Robert M. Primmer
per [signature]
Attorneys.

UNITED STATES PATENT OFFICE.

ROBERT M. PRIMMER, OF VINTON, IOWA.

IMPROVEMENT IN DITCHING-PLOWS.

Specification forming part of Letters Patent No. 117,813, dated August 8, 1871.

*To all whom it may concern:*

Be it known that I, ROBERT M. PRIMMER, of Vinton, in the county of Benton and State of Iowa, have invented a new and useful Improvement in Ditching-Machine; and I do hereby declare that the following is a full, clear, and exact description thereof, which will enable others skilled in the art to make and use the same, reference being had to the accompanying drawing forming part of this specification, in which—

Figure 1 is a top view of my improved ditching-machine. Fig. 2 is a side view of the same.

Similar letters of reference indicate corresponding parts.

My invention consists in a new way of constructing a mold-board for ditching-plows, by shaping the working-face so as to carry the sod up against a vertical plate, which turns it over on the said mold-board, and from which it is again partially turned to one side, but with the grass side toward the ditch.

A is the beam of the machine, to the forward end of which the draft is applied. To the sides of the forward end of the beam A are pivoted the rollers B, which roll along the surface of the ground and support the forward end of the said beam. C is the foot or shoe of the machine, which is connected with the rear part of the beam A by the standards D and brace E, and which is strengthened by stay-rods F. To the forward end of the foot C is attached a steel plate, G, the forward edge of which is made sharp and pointed, and which is designed to separate the soil to be raised from the bottom of the ditch. H is a cutter, the lower end of which is attached to the center of the forward part of the plow. The upper end of the cutter H is inclined forward at an angle of forty-five degrees, more or less, and is attached to the beam A. I are two cutters, the lower ends of which are attached to the side edges of the forward part of the plow. The upper ends of the cutters I are inclined forward at an angle of forty-five degrees, more or less, and are inclined outward at such an angle as will give the desired slope or inclination to the sides of the ditch. The upper ends of the cutters I are secured by wedge-keys to the ends of the bar J, the middle part of which is attached to the beam A. The cutters I are designed to separate the soil to be raised from the sides of the ditch, and the cutter H is designed to divide the soil to be raised into two equal parts. K are plates or mold-boards, the lower ends of which are attached to the plate G or to the forward end of the foot C. The plates or mold-boards K incline upward and are curved or twisted, as shown in Figs. 1 and 2, so as to raise the soil or sod, turn it three-quarters over, and leave it upon the ground about eighteen inches from the edge of the ditch, and with its grass side toward the ditch to prevent the soil from being washed back into the ditch by the rain. L are guard-plates attached to the lower part of the rear ends of the plates or mold-boards K to prevent the soil from falling back into the ditch at the rear of the plow. The rear ends of the guard-plates L are supported and braced by being attached to the ends of the cross-bar M. N are plates attached to the upper part of the rear ends of the plates or mold-boards K, to press against the upper part of the dirt or sod as left by the mold-boards, and smooth down any dirt or sod that may not have been turned flat by the plates or mold-boards K. The rear ends of the plates N are supported and braced by being attached to the ends of the bar *o*. P is a cutter placed at the point where the plates or mold-boards K begin to separate from each other, and which is designed to enter the cut made by the center cutter H and separate the parts of the soil being raised, so that each part may pass up its own mold-board. Q are two plates extending along the upper edges of the mold-boards K to prevent the soil from falling back into the ditch over the upper edges of the said mold-boards K. R is a cross-bar, the middle part of which is attached to the beam A, and which has rings attached to it near its ends for the attachment of the team to turn the machine over, draw it out of a ditch, or load it upon a wagon.

Having thus described my invention, I claim as new and desire to secure by Letters Patent—

The mold-boards K K and plates Q Q, combined, constructed, and relatively arranged as and for the purpose specified.

ROBERT M. PRIMMER.

Witnesses:
    E. H. STEDMAN,
    JOHN MCCARTNEY.